United States Patent
Paul et al.

(10) Patent No.: US 7,521,116 B2
(45) Date of Patent: Apr. 21, 2009

(54) PRESSURE SENSITIVE ADHESIVE TAPES FROM CATIONIC CURE ADHESIVES

(75) Inventors: Charles W. Paul, Madison, NJ (US); Peter A. Walter, Hampton, NJ (US); Cynthia L. Meisner, Monmouth Junction, NJ (US)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 11/443,381

(22) Filed: May 30, 2006

(65) Prior Publication Data

US 2006/0216521 A1  Sep. 28, 2006

Related U.S. Application Data

(62) Division of application No. 10/412,840, filed on Apr. 11, 2003.

(51) Int. Cl.
*B32B 27/38* (2006.01)
*B32B 7/12* (2006.01)
*B32B 37/14* (2006.01)

(52) U.S. Cl. .......................... 428/355 EP; 428/355 R; 428/413; 428/414

(58) Field of Classification Search ...................... None
See application file for complete search history.

(56) References Cited

U.S. PATENT DOCUMENTS

| 5,382,604 | A | | 1/1995 | Erickson | 522/158 |
| 5,383,568 | A | * | 1/1995 | Tusick et al. | 220/606 |
| 5,711,831 | A | * | 1/1998 | Taylor | 156/64 |
| 2003/0065048 | A1 | * | 4/2003 | Paul | 522/31 |

OTHER PUBLICATIONS

Erikson et al., Nov. 1995, "Liquid reactive polymers for radiation curable high performance PSAs," Adhesives Age.

* cited by examiner

*Primary Examiner*—Michael J Feely
(74) *Attorney, Agent, or Firm*—Cynthia L. Foulke

(57) ABSTRACT

Pressure sensitive adhesive tapes produced by a process where cationic cure is conducted against a paper film substrate and an optional second film substrate, both having low moisture content. The low moisture content is maintained during cationic cure by putting the pressure sensitive adhesive tapes in an environment where moisture ingress is prevented. The maintenance of low moisture during cure provides enhanced SAFT values.

14 Claims, 1 Drawing Sheet

PRESSURE SENSITIVE ADHESIVE TAPES FROM CATIONIC CURE ADHESIVES

Figure 1:
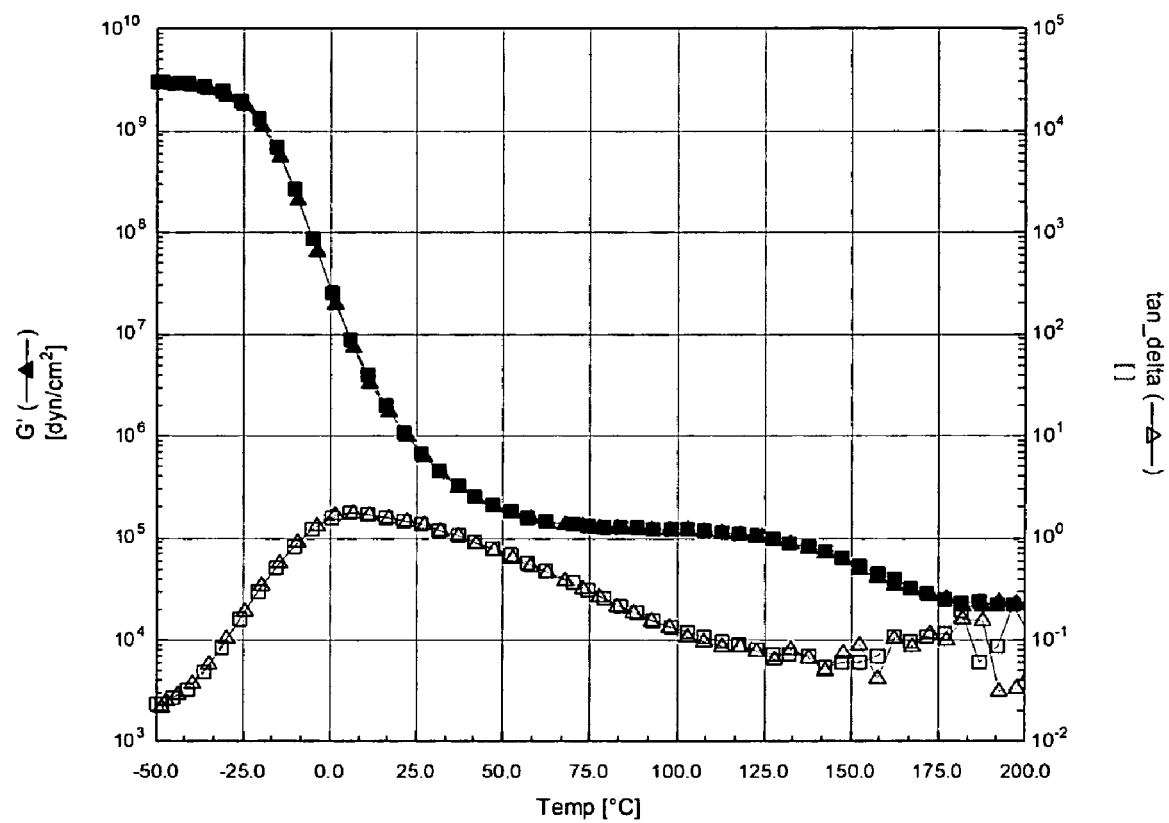

This is a divisional of application Ser. No. 10/412,840, filed Apr. 11, 2003.

FIELD OF THE INVENTION

The invention relates to the field of pressure sensitive adhesives (PSA). More specifically, the invention relates to a process for preparing PSA tapes where cationic initiation of cure is used.

BACKGROUND OF THE INVENTION

Radiation curable adhesives which cure by free radical mechanisms have gained wide acceptance in a number of product assembly applications. Cationic curing systems enjoy several advantages over free radical systems. First, cure is not instantaneous and thus the possibility exists to irradiate the sample and then make the bond. This feature obviates the need for one substrate being radiation transparent, which many are not. Secondly, since there is no termination mechanism other than neutralization of the active acid catalyst by impurities, the cure proceeds into the "dark" (i.e. non-irradiated) regions of the sample. Thus, if impurities are minimized the entire adhesive sample will eventually cure as long as one part of it is irradiated. Consequently thick films are readily cured at low dose (fast production speeds).

Most cationic systems use cycloaliphatic epoxide monomers or vinyl ethers. Kraton Polymers™ recently developed a system based on epoxidized block copolymers, with the epoxy groups residing almost exclusively in the polyisoprene blocks. These systems enabled highly flexible and even pressure sensitive radiation cured adhesives based on cationic cure chemistry. However, these systems have not gained commercial acceptance in part because cure has not been reproducible.

A need remains for a cationic curable PSA that can produce tapes of consistent quality in a production environment. The current invention addresses this need.

SUMMARY OF THE INVENTION

It has now been discovered that careful control of the moisture content of the release liner and/or backing substrate is critical to producing high performance PSA tapes, particularly those with high heat resistance. Simply ensuring the adhesive is dry before coating is not enough; it must be allowed to cure under low moisture conditions. For a tape or a roll of label stock, where a large volume of adhesive is present, controlling moisture access during cure is effected by controlling the moisture content of the release paper(s).

Preferred processes will maintain the moisture content of the release paper below about 5%, and protect the product roll of tape from substantial moisture ingress during cure, which can last several days. Most preferably the moisture content of the release paper liner(s) will be below 2% and the roll will be wrapped in plastic film such as shrink wrap or a poly bag promptly after production.

The invention provides cured adhesive tapes prepared by a process comprising coating a cationic curable adhesive onto a film substrate having a moisture content of less than about 5% and initiating cure, wherein the moisture content of the coated film substrate is maintained at a level of less than about 5% until the adhesive is substantially fully cured. In the practice of the invention a moisture content of less than about 4%, more preferably less than about 2%, are particularly desirable.

Preferred adhesives in this process will typically comprise from about 10 to about 60% by weight of at least one epoxidized block copolymer, from about 3 to about 60% of a compatible mono-ol such as rosin alcohol to control cure density, from 0 to about 30% by weight of at least one styrenic block copolymer, from about 20 to about 70% of at least one hydrocarbon resin and from 0 to about 30% of a mineral oil, and an effective amount of a cationic initiator.

Another aspect of the invention is directed to an adhesive tape produced by the inventive process.

BRIEF DESCRIPTION OF THE DRAWING FIGURES

FIG. 1 shows the effect of the curing environment on overall cure level of adhesive example 3 (-■-) and example 4 (-▲-).

DETAILED DESCRIPTION OF THE INVENTION

The disclosures of all references cited herein are incorporated in their entireties by reference.

The invention is directed to pressure sensitive adhesives that are applied as 100% solids and are cured cationically by an initiation process that takes place during the coating process. The preferred initiation step is the application of ultraviolet light or electron beam, most preferably ultraviolet light to the adhesive to generate a strong acid which initiates cationic cure. Cure is completed well after the tape has formed a roll. Most preferred is the cure of adhesives comprising an epoxidized rubber via ultraviolet initiated cationic cure.

The adhesives may, desirably, be formulated as a "hot melt," a "warm melt" or a liquid adhesive. "Hot melt" adhesives are defined here as those applied at temperatures from 250° F. to 400° F., whereas "warm melt" adhesives are applied at temperature above ambient but below 250° F. "Liquid" adhesives require no heat for their application; they are applied at ambient conditions.

As used herein, the term "pressure-sensitive adhesive" refers to a viscoelastic material which adheres instantaneously to most substrates with the application of slight pressure and remains permanently tacky. Pressure sensitive adhesives are bondable at ambient conditions indefinitely. Non-pressure sensitive adhesives are used to form bonds while in the molten state, i.e. they are applied hot to the substrate and bonded to the second substrate prior to setting. Once set they have little if any tack or bondability. One cannot coat these types of adhesives onto one substrate and create a bond with them to a second substrate at a later date at ambient conditions as can be done with a true pressure sensitive.

The term "curable" is used herein in its conventional sense as meaning capable of forming covalent cross-links.

The term "radiation-curable adhesive" as used herein means an adhesive composition which is curable upon exposure to actinic and/or ionizing radiation. The term "radiation" is used herein to include actinic radiation such as ultraviolet radiation and ionizing radiation created by the emission of electrons or highly accelerated nuclear particles such as neutrons, alpha-particles etc.

"Release liner(s)," "backing" and the like are referred to herein generally as film substrates. Such film substrates may be made of paper or other material known and conventionally used in the manufacture of adhesive tapes, labels and the like.

Preferred radiation curable adhesives comprise, as the base polymer, at least one epoxidized block copolymer capable of UV cationic curing. Epoxidized block copolymers which may be used in the practice of the invention include those described in U.S. Pat. Nos. 5,491,193, 5,516,824, 5,686,535, 5,776,998, and 5,837,749, and are commercially available from Kraton™ Polymers. Both radial and linear epoxidized block copolymers may be used in the practice of the invention for use. A preferred epoxidized block copolymer which may be used in the practice of the invention is KLP 207 (Kraton™ Polymers), a diblock copolymer prepared by the sequential polymerization of isoprene and butadiene, followed by hydrogenation and epoxidation. KLP 207 contains about 10 to 11 epoxide groups per molecule. Formulations suitable for use in the inventive process are described in: "Kraton Liquid™Polymer//Solid Polymer Hybrid UV Cure Adhesives with Stable Peel Strength", by J. R. Erickson, J. K. L. Schneider, and L. M. Kegley, presented at the Pressure Sensitive Tape Council Annual Meeting, 2002, and also in U.S. application Ser. No. 09/891,985, filed Jun. 26, 2001.

Adhesives of the invention will typically comprise about 3% to about 60% of an alcohol, most preferable a mono-ol. The alcohol acts as a chain transfer agent during cationic polymerization of the epoxy groups. The level will depend on the level of pressure sensitivity needed in the final adhesive and the amount and type of epoxidized block copolymer used. Diols can act as crosslinkers whereas mono-ols will act to reduce the crosslink density and improve the adhesion of the crosslinked polymer through pendant substituents. Diols used in excess (over the amount of epoxy) can also improve tack and reduce overall crosslink density. Mono-ols are most preferred. Examples of preferred mono-ols include rosin alcohol, available from Hercules under the tradename Abitol E, and L-1203 a hydrogenated butadiene monol available from Kraton™ Polymers.

The adhesive compositions of this invention also may include an aliphatic or cycloaliphatic hydrocarbon resin with or without aromatic modification (preferably without), such as those derived from terpene monomers or from petroleum-derived monomers, as tackifier. Preferred are hydrogenated petroleum-derived hydrocarbon resins. Non-limiting examples include aliphatic olefin derived resins such as those available from Goodyear under the Wingtack® tradename and the Escorez® 1300 series from ExxonMobil. A common $C_5$ tackifying resin in this class is a diene-olefin copolymer of piperylene and 2-methyl-2-butene having a softening point of about 95° C. This resin is available commercially under the tradename Wingtack 95 and is prepared by the cationic polymerization of a mixture containing approximately 60% piperylene, 10% isoprene, 5% cyclo-pentadiene, 15% 2-methyl-2-butene and about 10% dimer, as taught in U.S. Pat. No. 3,577,398. The resins normally have ring and ball softening points as determined by ASTM method E28 between about 20° C. and 150° C. Also useful are $C_5/C_9$ aromatic/aliphatic olefin-derived resins available from ExxonMobil in the Escorez 2000 series. Hydrogenated hydrocarbon resins are especially useful when the long term resistance to oxidation and ultraviolet light exposure is required. These hydrogenated resins include such resins as the Escorez 5000 series of hydrogenated cycloaliphatic resins from ExxonMobil, hydrogenated $C_9$ and/or $C_5$ resins such as Arkon® P70, P90, P115, P125 supplied by Arakawa Chemical, hydrogenated aromatic hydrocarbon resins such as Regalrez® 1018, 1085 and the Regalite® R series of resins from Hercules Specialty Chemicals. Other useful resins include hydrogenated polyterpenes such as Clearon® P-105, P-115 and P-125 from the Yasuhara Yushi Kogyo Company of Japan. Preferred for use are hydrogenated, cyclic or $C_5$ resins, such as Escorez 5400 (ExxonMobil), a hydrogenated DCPD (dicyclopentadiene) tackifier. Mixtures of two or more of the above described resins may be preferred for some formulations.

Adhesives of the invention will typically contain from about 20% to about 70% of the hydrogenated resin, more preferably from about 30% to about 60%.

The adhesives of the invention may also comprise up to about 30% by weight of an oil diluent. Suitable oils include olefin oligomers and low molecular weight polymers as well as vegetable and animal oil and their derivatives. The petroleum derived oils which may be employed are relatively high boiling materials containing only a minor proportion of aromatic hydrocarbons (preferably less than 30% and, more particularly, less than 15% by weight of the oil). Alternatively, the oil may be totally non-aromatic. Suitable oligomers include polypropylenes, polybutenes, hydrogenated polyisoprene, hydrogenated polybutadiene, or the like having average molecular weights between about 350 and about 10,000. Preferred are petroleum derived white oils such as Britol 35T, a paraffinic white oil and KAYDOL OIL a napthenic white oil, both of which are available from Witco Corporation.

The cationic initiators are typically employed in concentrations ranging from about 0.01% by weight to about 10% by weight, preferably in amounts ranging from about 0.05% by weight to about 1% by weight, more preferably from about 0.1% by weight to about 0.5% by weight. The concentration is chosen based on the coating thickness. Less is used for thicker coatings to ensure uniform initiation when radiation is used to effect initiation. Combinations of two or more photoinitiators may also be used. A preferred photoinitiator, is Sarcat CD1010 (available from Sartomer), a triaryl sulfonium hexafluoroantimonate salt also available from Union Carbide under the tradename Syracuse UVI 6974. For liquid adhesives the less thermally stable iodonium salt, Sarcat CD1012, is suitable. Iodonium salts are less thermally stable and consequently cure can be initiated by heat during the coating process either in combination with or instead of radiation-induced initiation. Typically thermal initiation by decomposition requires a temperature above 100° C. Alternatively, it is well known that iodonium salts can be initiated by electron-beam.

Photosensitizers may be added to extend the spectral response to higher wavelengths and thus speed cure and improve depth of cure. For example phenothiazine, perylene, and anthracene are effective sensitizers for both sulfonium and iodonium salts.

Combinations of photoinitiators may be used to achieve the best possible cure of adhesive compositions. Photoinitiators are preferably used in the least amount necessary to get initiation of cure at the line speed of the process. Cationic cure is inhibited by basic species such as amines or even water, and these must therefore be avoided.

Antioxidants are typically added to the commercially available compounds in order to protect the ingredients against degradation during preparation and use of the adhesive compositions, however without interfering with the irradiation curing of the polymer. Many antioxidants can inhibit cationic cure and therefore their use should be minimized. Combinations of antioxidants are often more effective due to the different mechanisms of degradation to which various polymers are subject. Certain hindered phenols, organo-metallic compounds, aromatic amines, aromatic phosphites, and sulphur compounds are useful for this purpose. Examples of effective types of these materials include phenolic antioxidants, thio compounds, and tris-(nonylated phenyl) phosphites.

To ensure long-term thermal stability, in general from about 0.05% to about 3% by weight of one or more antioxidants is included in the adhesive compositions, preferably from about 0.2% by weight to about 1.0% by weight.

In a preferred embodiment of the present invention the adhesive composition comprises from about 10% to about 35% by weight of at least one epoxidized block copolymer, 3-60% of a compatible mono-ol, from about 30% to about 60% by weight of at least one hydrocarbon resin, from about 0.02 to about 2.0% of a cationic initiator, from about 0 to about 15% of a styrenic block copolymer, from about 0 to about 30% of a mineral oil, and from about 0 to about 2% of an antioxidant.

The adhesives of the invention find particular use in the tape and label industry.

The pressure sensitive adhesives of the invention also may advantageously be used in the manufacture of adhesive articles including, but not limited to, labels, industrial tapes and transfer films. Single and double face tapes, as well as supported and unsupported free films are encompassed by the invention. In one embodiment, the adhesive article comprises an adhesive coated on at least one major surface of a backing having a first and second major surface. Useful backing substrates include, but are not limited to cellulosic material, foam, metal, fabric, and various polymers such as polypropylene, polyamide, polyester, polyethylene terephthalate, and mixtures thereof. The adhesive may be present on one or both surfaces of the backing. When the adhesive is coated on both surfaces of the backing, they can be the same or different.

The inventive process consists of a method to prepare rolls of tape or label stock where the cationic cure of the adhesive is complete and without the presence of an undercured surface layer. To achieve thorough cure throughout with moisture absorbing substrates requires careful control of the moisture prior to coating and afterwards. Examples of such moisture-absorbing substrates include paper-based release liners or paper labels, polyurethane or polyamide films or foams. Moisture content can be controlled by drying or not-rehumidifying the substrates excessively during manufacture. Typically silicone-based release liners are dry after cure of the silicone, but are rehumidified prior to rewind. Drying of the release liner or substrate can be conducted by placing the roll of material in an oven, typically above the boiling point of water (212° F.) for an hour or so, or at a lower temperature under vacuum. Alternatively, the liner or substrate can be dried in line prior to coating with adhesive by application of hot air at elevated temperature or by microwave or IR dryers.

Once the roll of pressure sensitive adhesive has been manufactured it is important to avoid subsequent moisture ingress. This can be achieved by simply wrapping the roll in a moisture barrier, such as polyolefin film, or by storing it in a low humidity environment. A humidity below 50% RH at 23° C. is preferred, more preferably below 10%, and most preferably about 0% through the use of desiccants or thermo-mechanical air dryers.

The invention can be illustrated by the following non-limiting examples.

EXAMPLES

A cationic curing adhesive 36-646A based on KLP L-207 (a liquid epoxidized block copolymer available from Kraton Polymers™) was prepared in a hot melt mixer using a pre-dispersed cationic UV-photoinitiator (UVI-6974—a triarylsulfonium salt available from Union Carbide). The pre-dispersion in L-207 was obtained from Kraton™ polymers. Methods of preparing such adhesives are described in "Kraton Liquid™Polymer//Solid Polymer Hybrid UV Cure Adhesives with Stable Peel Strength", by J. R. Erickson, J. K. L. Schneider, and L. M. Kegley, presented at the Pressure Sensitive Tape Council Annual Meeting, 2002.

The adhesive was melted down in an ITW hot melt tank at 200° F. and then coated via a 6 inch wide slot head onto release paper at an adhesive thickness of 5 mils. The coating passed through an Aetek 400 watt/in H-bulb and then was nipped to another release paper. The adhesive was coated to a release paper with a tighter (harder) release (T3070) and nipped to an easy release liner (P1000). The line speed was 60 ft/min and the UV power was 50%. Both release papers T3070 and P1000 were obtained from Enterprise.

Rolls of release liner were conditioned at various temperatures and humidities to obtain different levels of moisture in the paper. In one case the liner was misted with water and then partially dried and rewound. Moisture content was determined following the general guidelines of TAPPI method T412 om-94. A 4 inch×4 inch square was cut from the center of the release roll about 10 layers deep. The outside two bottom and top layers were removed from the stack and it was placed into a preweighed 250 ml Ehrlenmeyer flask. The flask was covered with aluminum foil and weighed. The weight of the paper was 6-12 grams. The flask was placed in an oven at 250° F. and the aluminum foil was removed. The samples were allowed to dry for a total of 2.5 hours (at which time they had reached constant weight). Before reweighing the samples were allowed to cool in a desiccator.

In the first set of experiments, the transfer tapes made on the coater were cut from the roll immediately and allowed to cure as sheets under dry (in a desiccator) or standard (23° C./50% RH) conditions. The time to fully cure this cationic-initiated adhesive is roughly 3 days. All properties were measured after at least 5 days of cure time.

Gel content was determined by weighing a piece of film, extracting the film in cyclohexane overnight, removing the swollen extracted film gel, drying the film, and comparing the dried weight to the theoretical percentage of ingredients in the formula that can participate in the curing process.

Shear Adhesive Failure Temperature (SAFT) was determined by transferring cured films to 2 mil corona-treated PET, bonded a 1 inch×1 inch square of adhesive tape to a stainless steel plate (using a PSTC automated roller from Chemsultants), allowing a 20 minute time to wet-out the plate, and then placing it an oven at room temperature and hanging a 1 kg weight. The temperature is then ramped up quickly to 120° F. and then is raised subsequently at 1° F./minute. The time of failure is noted. None of the samples failed cohesively. Adhesive failure was from the steel panel in almost every case, sometimes with heavy ghosting or residue left on the plate—a sign of a weak surface layer in the adhesive. Each reported value is an average of 4 samples.

Peel and probe tack were measured on films transferred to 2 mil corona-treated PET.

Peel was conducted using a PSTC automated roller from Chemsultants to bond 1 inch wide strips to clean stainless steel panels. These were allowed to wet-out for 20 minutes prior to being pulled at 180 degrees and a speed of 12 inches/min. Each reported value is the average of 3 measurements.

Probe tack was conducted using a Texture Analyzer (TA-XT2i) and a stainless steel probe. Maximum force on retraction was recorded. Each reported value is an average of 5 measurements.

As shown in Table 1, the conditions under which the sample batches of adhesive are cured is important. Dry conditions produces slightly higher gel fraction, but significantly higher SAFT. Peel and probe tack are not affected.

TABLE 1

| Example | Batch | Moisture content of liner (%)[a] | | Curing conditions | Gel content (%) | SAFT (° F.) | Peel (lb/in) | Probe tack (g) |
|---|---|---|---|---|---|---|---|---|
| | | Easy Release | Hard Release | | | | | |
| 1 | A | 4.4 | 4.8 | desiccator | 72.1 | 282 | 7.5 | 501 |
| 2 | A | 4.4 | 4.8 | 23° C./50% RH | 69.3 | 238 | 7.4 | 466 |
| 3 | B | 4.4 | 4.8 | desiccator | 70 | >350 | 6.9 | 467 |
| 4 | B | 4.4 | 4.8 | 23° C./50% RH | 68.4 | 262 | 7.2 | 480 |

[a]moisture content as-received

This adhesive and others of this type are very hydrophobic and are manufactured and applied at high temperature, thus there is essentially no chance of water being present in the adhesive. However, water is present in the release liner. While the adhesive will absorb very little water, the surface of the adhesive can be affected significantly. Undercure at the surface of the adhesive can produce a weak undercured outer layer on the PSA, which could be responsible for the low SAFT. Adhesive failure with ghosting is consistent with this hypothesis.

RDA (Rheometrics Dynamic Analysis) was conducted on cured films (examples 3 and 4) as described below. FIG. 1, which illustrates the effect of the curing environment on overall cure level of adhesive example 3 (-■-) and example 4 (-▲-), shows that the overall level of cure was virtually identical as determined by this bulk method. However, the SAFT was much lower on the adhesive cured at 50% RH (see Table 1). Again, this indicates a thin undercured layer at the surface may be responsible for the low SAFT.

Rheology

A Rheometrics Dynamic Mechanical Analyzer (Model RDA 700) was used to obtain the elastic (G') and loss (G") moduli versus temperature. The instrument was controlled by Rhios software version 4.3.2. Parallel plates 8 mm in diameter and separated by a gap of about 2 mm were used. The sample was loaded and then cooled to about −100° C. and the test started. The program test increased the temperature at 5° C. intervals followed by a soak time at each temperature of 10 seconds. The convection oven containing the sample was flushed continuously with nitrogen. The frequency was maintained at 10 rad/s. The initial strain at the start of the test was 0.05% (at the outer edge of the plates). An autostrain option in the software was used to maintain an accurately measurable torque throughout the test. The option was configured such that the maximum applied strain allowed by the software was 50%. The autostrain program adjusted the strain at each temperature increment if warranted using the following procedure. If the torque was below 200 g-cm the strain was increased by 25% of the current value. If the torque was above 1200 g-cm it was decreased by 25% of the current value. At torques between 200 and 1200 g-cm no change in strain was made at that temperature increment. The shear storage or elastic modulus (G') and the shear loss modulus (G") are calculated by the software from the torque and strain data. Their ratio, G"/G', also known as the tan delta, was also calculated.

A second set of experiments was conducted which represents a situation more similar to a tape production environment. For large rolls of tape, the adhesive will cure under conditions where little additional moisture can enter. Thus the moisture in the release liner itself is the primary issue. To simulate a production environment, rolls of transfer tape were made as before, but with release liners containing various levels of moisture. The rolls were immediately placed in a double bag of PE film (2 layers each 4 mils thick). The films cured in the bag for at least five days prior to testing.

As shown in Table 2, the moisture content of the liner has a dramatic effect on the SAFT of the adhesive. Again, failures were adhesive not cohesive. Clearly the lower the moisture content the better.

TABLE 2

| Example | Batch | Moisture content of liner (%) | | Curing conditions | SAFT (° F.) |
|---|---|---|---|---|---|
| | | Easy Release | Hard Release | | |
| 5 | C | 4.4[a] | 4.8[a] | PE bags (2) | 298 |
| 6 | B | 4.4[a] | 4.8[a] | PE bags (2) | 298 |
| 7 | B | 4.4[a] | 8[e] | PE bags (2) | 185 |
| 8 | B | 4.3[b] | 5.2[b] | PE bags (2) | 281 |
| 9 | B | 7[c] | 6.2[c] | PE bags (2) | 182 |
| 10 | B | 1.7[d] | 1.6[d] | PE bags (2) | 345 |

[a]moisture content as-received
[b]moisture of roll conditioned for 16 days at 23° C./50% RH
[c]moisture of rolls conditioned for 16 days at 23° C./90% RH
[d]moisture of rolls dried two days in an oven at 220° F.
[e]moisture content obtained by addition of water The temperature of the adhesive is hottest as it exits the UV lamp. The temperature was measured at this location using a non-contact infrared thermometer in adhesive example 6. The temperature recorded was 63° C.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

The invention claimed is:

1. A pressure sensitive adhesive article prepared by a process comprising:
coating a cationic curable adhesive onto a paper film substrate having a moisture content of less than about 5%, initiating cure of the adhesive, optionally applying a second film substrate to said coated paper film substrate, said second film substrate having a moisture content of less than about 5%, and maintaining the moisture content of the paper film substrate and the optional second film substrate at a level of less than about 5% for a period of time, allowing the adhesive to substantially fully cure.

2. The adhesive article of claim 1 wherein cure of the adhesive is initiated by exposing the adhesive to radiation.

3. The adhesive article of claim 2 wherein cure of the adhesive is initiated by exposing the adhesive to UV radiation.

4. The adhesive article of claim 3 wherein the adhesive comprises an epoxidized block copolymer.

5. The adhesive article of claim 4 wherein the adhesive comprises from about 10 to about 60% by weight of at least one epoxidized block copolymer, from about 3 to about 60% of a compatible mono-ol such as rosin alcohol to control cure density, from 0 to about 30% by weight of at least one styrenic block copolymer, from about 20 to about 70% of at least one hydrocarbon resin, from 0 to about 30% of a mineral oil, and an effective amount of a cationic initiator.

6. The adhesive article of claim 1 where the moisture content of the paper film substrate and the optional second film substrate is and is maintained at a level of less than about 4%.

7. The adhesive article of claim 6 where the moisture content of the paper film substrate and the optional second film substrate is and is maintained at a level of less than about 2%.

8. The adhesive article of claim 1 which is a roll of tape, a label stock or a transfer film.

9. The adhesive article of claim 8 which is a label stock.

10. The adhesive article of claim 8 which is a roll of tape.

11. The adhesive article of claim 8 which is a transfer film.

12. The roll of tape, label stock or transfer film of claim 8 wherein the adhesive comprises from about 10 to about 60% by weight of at least one epoxidized block copolymer, from about 3 to about 60% of a compatible mono-ol such as rosin alcohol to control cure density, from 0 to about 30% by weight of at least one styrenic block copolymer, from about 20 to about 70% of at least one hydrocarbon resin, from 0 to about 30% of a mineral oil, and an effective amount of a cationic initiator.

13. The adhesive article of claim 1 wherein the moisture content of the paper film substrate and the optional second film substrate is maintained at said level by placing said article in a double bag of polyethylene film.

14. The adhesive article of claim 1 wherein the paper film substrate is a paper release liner or a paper backing.

* * * * *